July 28, 1953 C. E. RIVAS 2,647,168

MAGNETIC SOUND RECORD EDITING MACHINE

Filed Dec. 18, 1950 2 Sheets-Sheet 1

INVENTOR.
Carlos C. Rivas.
BY Lynn H. Latta
Attorney.

July 28, 1953 C. E. RIVAS 2,647,168

MAGNETIC SOUND RECORD EDITING MACHINE

Filed Dec. 18, 1950 2 Sheets-Sheet 2

INVENTOR.
Carlos C. Rivas.

BY

Lynn Latta
Attorney.

Patented July 28, 1953

2,647,168

UNITED STATES PATENT OFFICE 2,647,168

MAGNETIC SOUND RECORD EDITING MACHINE

Carlos E. Rivas, Hollywood, Calif., assignor to Mark U. Serrurier, Los Angeles, Calif.

Application December 18, 1950, Serial No. 201,439

9 Claims. (Cl. 179—100.2)

This invention relates to a machine for editing magnetic sound record tape or film. The invention is particularly adapted for editing a sound record of the type embodying a thin film of magnetic material in the form of iron oxide, carried by a tape or ribbon of thin plastic material which may be similar to movie film. Such tape is commonly employed in making the original sound record in connection with a cinema film, and the invention in some of its aspects is directed to the solution of problems in connection with the handling of such tape. However, in its broader aspect, the invention is applicable to the editing of other types of magnetic sound record including the magnetic wire type of record, requiring, however, a different type of reeling mechanism therefor.

The invention is directed primarily toward the problem of locating and marking exactly any selected point on a sound record, such as the point where a selected sound commences or terminates, in order that the tape may be severed exactly at the selected point on the record. Since a single sound may be extended over several feet or even yards of a sound tape, the location of the exact limits of the sound on the record poses a very substantial problem. The extent of this problem will be understood when it is considered that in order to reproduce the sound, there must be relative movement between the sound tape and a pick up head, at approximately the normal speed of movement of the tape past the head in reproducing operations. Since this speed is ordinarily 1½ feet per second, it will be apparent that it is definitely a difficult matter to locate and mark the exact limit of a sound on a sound film that is travelling at such a rate of speed past a pick up device.

With the foregoing in mind, the invention contemplates a novel system of editing a sound tape, embodying broadly the following steps, performed in sequence: (*a*) continuous movement of the tape past a magnetic pick up head at a normal rate of speed to reproduce the sound in its normal pitch, until a selected sound is reached; (*b*) arresting the travel of the tape; (*c*) while the tape is stationary, moving the pick up head back and forth along the tape at a rate of speed such as to effect a normal reproduction of the sound, with a repetition of the reproduction; and (*d*) narrowing down the effective scanning path of the pick up head so as to progressively reproduce shorter and shorter portions of the sound, with a selective elimination of either the beginning or the terminal portion of the sound, or that portion of the sound record immediately preceding or following the beginning or terminal portion of the sound, until the exact location of the beginning or terminal portion or any other selected point in the sound is located.

A further object is to provide a relatively simple mechanism for performing the steps in the above outlined method.

A further object is to provide an editing machine in the form of a unit that is readily attachable to a conventional editing machine having a sound reproducer, hoppers for the sound tape, etc.

A further object is to provide a relatively simple yet efficient arrangement for mounting and driving a magnetic pick up head in a reciprocating path, while maintaining electrical connections thereto.

A further object is to provide a relatively simple but efficient and dependable arrangement for making and breaking the circuit to a pick up head which is being reciprocated back and forth in a linear path, with selective adjustment of the timing on both the make and the break, whereby to vary the path of effective scanning operation of the pick up head.

Another object is to provide an improved system for synchronizing a sound track to a picture film.

Other objects will become apparent in the ensuing specifications and appended drawings in which.

Figures 1, 2, 12:
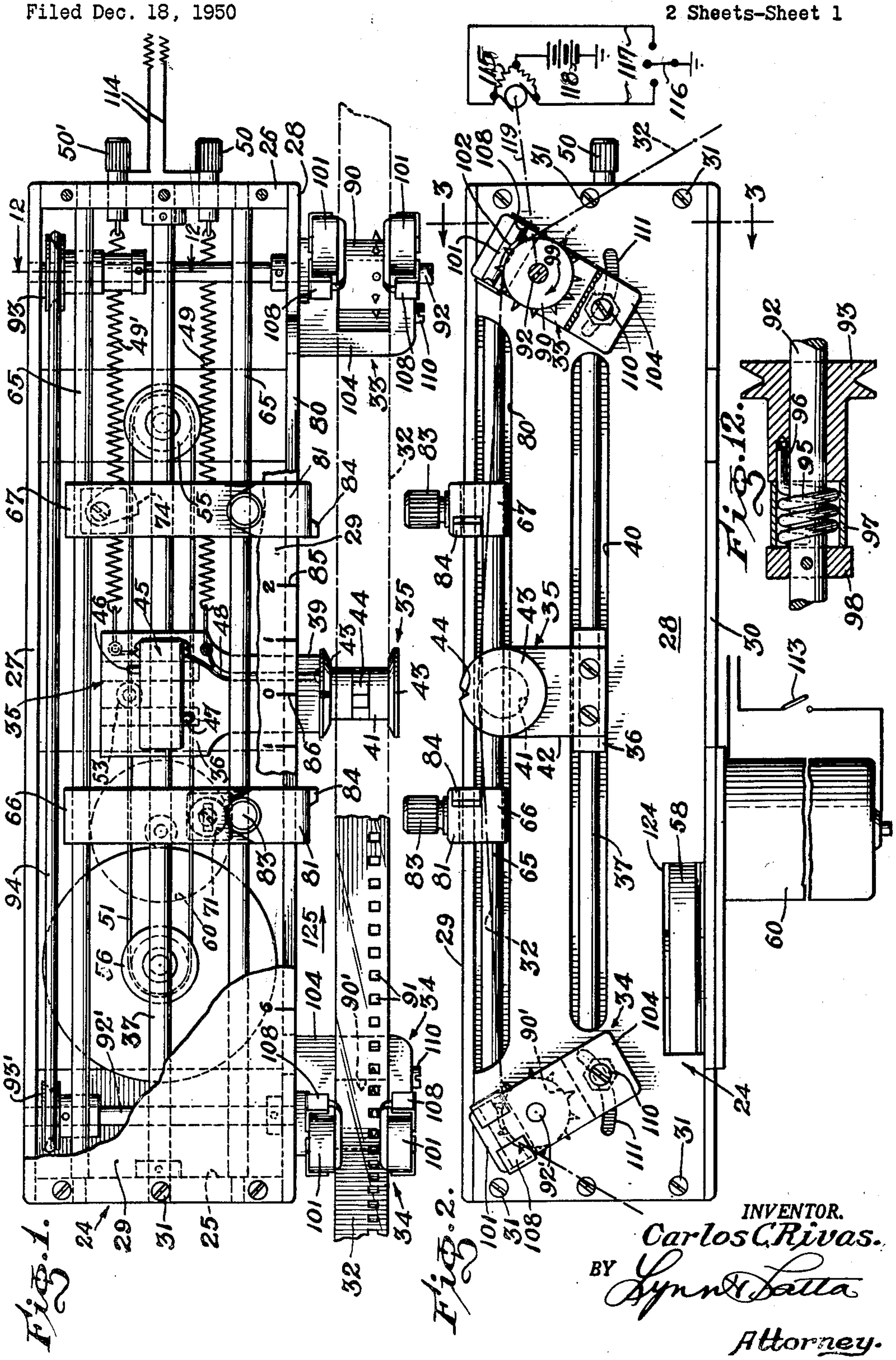
Fig. 1 is a plan view, with portions thereof broken away, of an editing mechanism embodying my invention.
Fig. 2 is a right side view thereof with a portion of a sprocket hold down unit broken away and shown in section.
Fig. 12 is a detail sectional view of the one way drive friction clutch forming a part of the drive mechanism.

My improved editing method will be understood more fully in connection with the description of the operation of the mechanism which is illustrated herein merely as an example of one form in which the apparatus of my invention may be embodied.

In the mechanism illustrated, there is provided a supporting frame in the form of a casing 24 having end members 25, 26, removable side plates 27 (left) and 28 (right), a cover panel 29, and a bottom 30. Cover panel 29 and side plates 27, 28 are removably attached to end members 25, 26 by any suitable means such as by means of screws 21. The casing is in the form of a long rectangular box, which may be substantially square in cross section as shown, and which is adapted to be mounted upon a conventional editing machine in a position such that the operator may look down upon the cover panel 29, with the longitudinal axis of the casing extending away from him, with the end member 25 being the near end, the side 27 located on his left and the side 28 located on his right.

The sound tape, indicated at 32, travels over drive sprocket units which are indicated generally at 33 and 34 respectively, so that a stretch of the tape extends between the sprocket units. The tape 32 is adapted to be scanned by a magnetic pick up unit which is indicated generally at 35 and is shown in inverted perspective in Fig. 5. Pick up unit 35 embodies a carriage 36 disposed transversely in casing 24, and mounted for reciprocating sliding movement longitudinally of casing 24, as follows: a rail 37, in the form of a round rod the ends of which are anchored in respective end members 25, 26, passes through a cylindrical bore 38 extending transversely through carriage 36. Carriage 36 has a neck portion 39 which projects from casing 24 through a slot 40 extending longitudinally in side plate 28. Neck 39 bears against the edge of side plate 28 which defines the lower side of slot 40, such bearing engagement cooperating with the engagement of rail 37 in bore 38 to support carriage 36 in a horizontal plane, and the engagement of rail 37 in bore 38 serving to maintain the longitudinal axis of the pick up unit at right angles to the longitudinal axis of casing 24. Carriage 36 includes a pick up head 41 carried at the upper end of an arm 42 projecting upwardly from neck 39, and having flanges 43 for guiding the sound record 32 over a magnetic gap 44 which is sensitive to the magnetic lines of force intersecting the same as the sound tape moves over the pick up head (or the pick up head moves under the sound tape). The sound tape bears against pick up head 41 as it moves between drive units 33, 34.

Pick up unit 35 includes a reset micro switch 45 of a known type embodying an "on" button 46 and an "off" button 47, and operating as follows: when button 46 is pressed, a circuit will be established through the switch and will be maintained until the "off" button 47 is pressed, whereupon the circuit will be interrupted and will remain interrupted until the "on" button 46 again is pressed. Two lead wires from the pick up head 41, indicated at 48, are connected, one to a conductor 49 in the form of a coil spring and the other to one side of the switch 45. The other side of switch 45 is connected to a coil spring conductor 49'. The conductors 49, 49' each have one end anchored to the pick up carriage 36 and the other end anchored to a respective binding post 50, 50', from which conductors 114 may extend to a conventional sound amplifying system including a speaker through which the sound may be transmitted to the ears of the operator. Such mechanism may form a part of a conventional editing machine to which the present invention may be applied as an attachment, or may if desired be built into the machine of my invention.

For driving the pick up unit 35 in a reciprocating path, the invention provides an endless drive belt 51 which, though flexible, is fairly stiff (preferably of steel tape). Belt 51 carries a stud 52 on the upper end of which is journalled a drive transmitting roller 53. Roller 53 is engaged between parallel ways 54 in the under side of carriage 36, extending longitudinally thereof and transversely to the longitudinal axis of casing 24. Drive belt 51 is stretched between drive pulleys 55, 56, pulley 55 being an idler pulley mounted on a post 57 anchord to bottom member 30, and pulley 56 being secured to a resilient wheel 58 which is rim driven by a capstan 59 secured to the shaft of an electric motor 60. Pulley 56 and drive transmitting wheel 58 are journalled upon stub shaft 61 which is anchored to a mounting plate 62. Motor 60 is likewise secured to mounting plate 62, which in turn is secured in bottom member 30.

Drive stud 52, where it projects beyond the upper edge of drive belt 51, is offset outwardly therefrom sufficiently to clear the upper flanges of pulleys 55, 56. It will now be apparent that, as the pulley 56 is driven by motor 60, belt 51 will travel around the pulleys 55, 56 and drive transmitting roller 53 will be carried around in the path of belt 51, shifting from side to side as it passes around the pulleys. Such lateral shifting will be accommodated by the sliding of roller 53 longitudinally between ways 54, while the movement, longitudinally of casing 24, will be transmitted to carriage 36, causing the pick up head to be reciprocated longitudinally of the casing.

Figures 3, 4, 5, 6, 7, 8, 9, 10, 11:
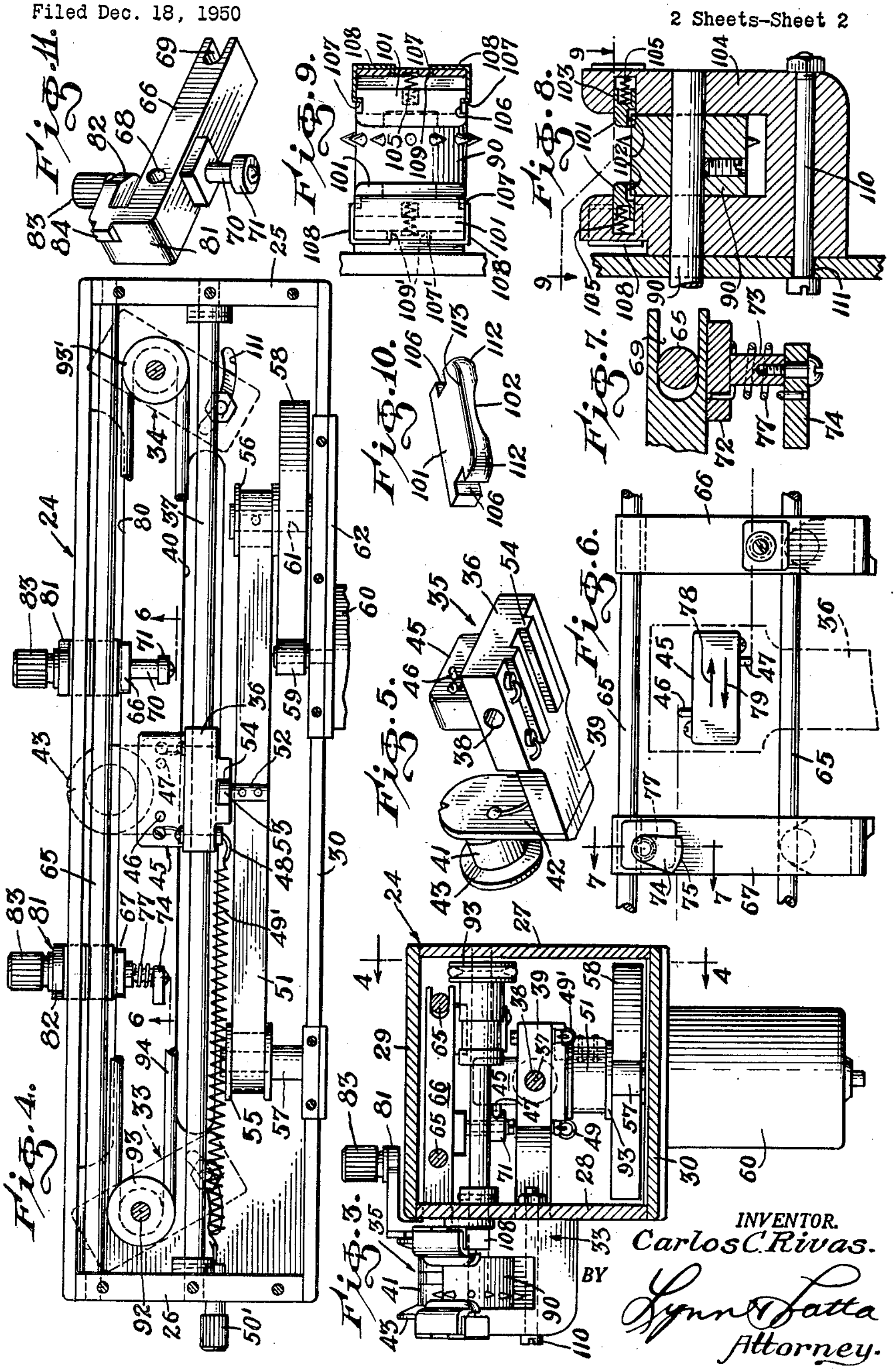
Fig. 3 is a detail transverse sectional view taken on the line 3—3 of Fig. 2.
Fig. 4 is a left side view of the mechanism; side 27 removed.
Fig. 5 is a perspective view of the magnetic pick up head.
Fig. 6 is an inverted plan view of the central portion of the machine, illustrating the circuit make and break mechanism taken on the line 6—6 of Fig. 4.
Fig. 7 is a detail sectional view of the circuit maker trigger unit, taken on the line 7—7 of Fig. 6.
Fig. 8 is a detail axial sectional view of a sprocket hold down unit.
Fig. 9 is a detail sectional view of the same taken on the line 9—9 of Fig. 8.
Fig. 10 is a perspective detail view of one of the hold down claws.
Fig. 11 is a perspective view of one of the sliding sound limiter controls with circuit breaker roller carried thereby.

The invention provides for energizing the pick up head 41 only during its travel in one direction (the direction of movement relative to sound tape 32 which will properly reproduce the sound on the record 32). Accordingly, provision is made for energizing the pick up head by closing the circuit through switch 45 when the pick up unit is moving in one direction and deenergizing the pick up head by interrupting the circuit through switch 45 at a subsequent point in the path of travel in that direction. The switch is left open throughout the entire return movement and that portion of the succeeding movement in the original direction up to the point of reclosing the switch. Furthermore, the invention provides for shifting both the point of switch closing and the point of switch opening, so as to confine the range of energized scanning of the sound tape to any selected portion of the path of travel of the pick up unit. The invention further provides for making such adjustment without arresting the reciprocating travel of the pick up head. Thus it becomes possible to progressively narrow down the scanning field and to shift it in either direction with reference to the record tape (arrested in a fixed position), so as to rapidly locate, with extreme accuracy, any point in a selected sound. The mechanism for such on and off control of the pick up energizing circuit comprises a pair of sliding sound limiter controls constructed and mounted as follows:

A pair of parallel rails 65 are disposed adjacent the cover plate 29, and have their ends mounted in the end members 25, 26. A pair of sliders 66, 67 are mounted on the rails 65 for sliding movement longitudinally of the casing 24, each of said sliders having a bore 68 through which one of the rods 65 extends, and an end notch 69 receiving the other rod 65. Slider 66 is shown in perspective in Fig. 11. On its under side it carries a downwardly projecting stud 70 on the lower end of which is journalled a roller 71 which is positioned to ride over the switch opening button 47 as the pick up unit 35 moves past it. The slider 67 (Figs. 6 and 7) carries on its under side a fitting 72 which is formed with a downwardly projecting stud 73 to the lower end of which is pivoted an actuator finger 74 of sector shape, having an arcuate end face 75, concentric with its pivotal axis, which is adapted to ride upon switch closing button 46 and to depress the same so as to close the switch 45. Actuator finger 74 will hereinafter be referred to, for briefness, as a trigger. It is normally disposed in the canted position shown in Fig. 6, and is held yieldingly in this position, by a coil spring 77 having one end anchored in fitting 72 and the other end anchored in the finger 74, as shown in Fig. 7. As the finger 74 rides upon button 46, the frictional engagement therewith will cause it to swing in the direction of movement of button 46, indicated by arrow 78 in Fig. 6, until the button has been fully depressed, whereupon the button will slide past the finger 74 and the latter will return to its normal position.

Since the button 46 will engage finger 74 twice in each cycle of operation, once in approaching the pulley 55 and again when moving away from the pulley 55, and since the switch is to be closed only once during each cycle, the finger 74 is arranged to simply be deflected laterally by engagement of button 46 against the sides thereof, when the pick up unit is moving in the return direction (indicated by arrow 79). Such lateral deflection is permitted by the yielding of spring 77, and does not depress the button 46. When the button has passed the trigger, the trigger will return to its normal position.

Each of the sliders 66, 67 (Figs. 6, 11) extends through a slot 80 in side plate 28 of casing 24, and has an upwardly extending arm 81 terminating in an arm 82 projecting over the cover 29 and provided with a handle 83 for manipulation of the slider. Arm 81 is provided with an indicating pointer 84 pointing toward the record tape 32. Pointer 84 is positioned at that side of the respective slider which faces the other slider. These near sides of the sliders cooperate with indicating marks 85 on the cover plate 29, for indicating distances from a zero mark 86 disposed midway between the ends of casings 24. Indicator marks 85 are spaced apart a distance corresponding to the distance between frames on a picture film. Suitable indicating characters "1", "2", etc., are employed to designate the number of frames that they are distant from the center mark 86.

It will now be apparent that as the pick up unit travels in the direction indicated by arrow 78, travelling toward pulley 55, that starting button 46 will ride against the arcuate end face 75 of finger 74, and will be depressed as it passes finger 74, thus closing switch 45 and rendering pick up head 41 sensitive to the magnetic lines of force which are cut by it as it travels toward slider 66. As it reaches slider 66, cut off button 47 will ride past roller 71 and will be thereby depressed so as to open the circuit, rendering the pick up head "dead" while the pick up unit travels to the end of its operative stroke, reverses itself and travels to the other end of its path of travel, and returns to the slider 67. Thus the effective scanning path of the pick up head is confined to the movement of the head from the slider 67 to the slider 66. Accordingly, as the pick up head is reciprocated back and forth beneath the sound tape 32, it will reproduce the sound on that portion of the sound track which lies between the inner sides of sliders 66, 67, and will be insensitive to the remainder of the sound record. Thus it becomes possible, by shifting the sliders 66, 67, to selectively render the pick up head sensitive to any portion, large or small, of the stretch of sound tape lying between the feed sprocket units 33 and 34. Such adjustment can be accomplished without interrupting the reciprocating movement of the pick up head.

In the preliminary locating of the sound that is to be marked on the sound tape, the pick up head is allowed to remain in a stationary position while the sound track is passed thereover, travelling between the sprocket units 33, 34. The system includes means for driving sprocket units 33, 34 selectively either in forward or reverse direction, and for maintaining the stretch of tape 32 between the sprocket units taut in either case. Drive unit 33 includes a sprocket 90 adapted to mesh with sprocket perforations 91 in the tape 32, and a shaft 92, sprocket 90 being secured upon an end of shaft 92 projecting from the right side of casing 24. Similarly, drive unit 34 includes a sprocket 90′ mounted on a projecting end of a shaft 92′ and likewise adapted to mesh with perforations 91 in tape 32. Shafts 92, 92′ extend between and are journalled in the respective side plates 27, 28 of casing 24. Secured to the respective shafts, within casing 24, are respective pulleys 93, 93′. An endless belt 94 extends around pulleys 93, 93′, in driving engagement therewith. Pulley 93 is slightly larger than pulley 93′. Pulley 93 is connected to shaft 92 (Fig. 12) through a one way friction clutch comprising a coil spring 95 having an end 96 anchored in the hub of pulley 93 and having its other end free. Spring 95 hugs shaft 92 with a frictional grip. A sleeve 97 may optionally be employed as a casing for spring 95, which is confined between pulley 93 and a collar 98, pinned to shaft 92. Collar 98 serves as an abutment to position spring 95 and pulley 93 against inward longitudinal movement on shaft 92, movement in the other direction being restricted by side plate 27. Except for the one way action of clutch spring 95, pulley 93 is rotatably mounted on shaft 92.

A suitable drive to shaft 92 from a reversible motor 115 (which may be part of a conventional picture editing machine) is indicated schematically at 119 in Fig. 2. Motor 115 is manually controlled by a two-way switch 116 forming part of an energizing circuit 117 including a source of electric energy 118. For normal scanning operations, shaft 92 is driven in a clockwise direction, as indicated by arrow 99 in Fig. 2. Rotating in this direction, it tends to unwind clutch coil 95 and thus turns freely within pulley 93. Accordingly, drive is transmitted to driving unit 34 directly through tape 32, taughtness therein being maintained by the frictional bearing load of shaft 92′ in its bearings.

When shaft 92 is driven in the reverse direction, clutch spring 95 engages and transmits drive from shaft 92 to shaft 92′ through slipping belt 94, which tends to drive shaft 92′ ahead of shaft 92 owing to the fact that pulley 93 is slightly larger than pulley 93′. This overdriving of shaft 92′ maintains the taughtness in tape 32 between driving units 33, 34. Thus adequate taughtness is maintained in either direction of drive.

*Hold down mechanism*

One of the important aspects of the system is the provision for an effective means for holding tape 32 against sprockets 90, 90′. For this purpose, each of the driving units 33, 34 includes a pair of hold-down claws 101 each having an arcuate bearing face 102 for engaging a respective edge portion of tape 32 and holding the same snugly against the cylindrical periphery of a respective sprocket 90, 90′. The arcuate bearing face 102 has a circumferential extent of approximately 60°, permitting the tape 32 to bend through an angle of approximately 120° in passing over a sprocket. Because of this 120° bend in the tape, sufficient lateral stiffness is developed in the bent portion of the tape (corresponding to a section of the wall of a cylindrical tube) to prevent any possible transverse buckling of the tape such as would be necessary in order for the tape to escape from beneath the opposed claws 101 engaging its respective edge area.

Claws 101 are mounted for yieldingly retracting movement in slots 103 (Fig. 8) in the respective arms of a yoke 104 which embrace a respective sprocket 90 or 90′ and form a bearing for one end of a respective shaft 92 or 92′. Coil springs 105, confined under compression between the bottoms of slots 103 and the bottoms of bores in jaws 101, function to urge the jaws toward each other, to their normal positions covering tape 32. Movement of claws 101 toward each other is limited by the engagement, in notches 106 in the respective ends of the claws, of flanges 107 of retainer clips 108. Retainer clips 108 are detachably secured to respective corner portions of yoke 104 by engagement of flanges 107 and 107′ in vertical grooves 109, 109′ which secure the clips against displacement from yoke 104 except by vertical sliding movement. By sliding them upwardly they may readily be removed so as to permit the withdrawal of claws 101 from their respective grooves 103.

Yokes 104 (Fig. 2) are normally disposed in upwardly diverging positions such that their longitudinal axes will substantially bisect the angle between the operative stretch of tape 32 and the respective portions thereof which extend downwardly from sprockets 90, 90′ into the receptacles from which the tape is being withdrawn and into which it is being deposited. The angle of divergence of yokes 104 may be adjusted about the axes of shafts 92, 92′, and may be fixed by tightening bolts 110 which extend through the lower portions of yokes 104 and through arcuate slots 111 in side plate 28. Substanial tangency will exist between the operative stretch of tape 32 between sprockets 90, 90′ and the periphery of the sprocket, and between the latter and the adjacent downwardly extending portions of the tape, when the yokes 104 are properly adjusted.

The inner corners of claws 101 are rounded as indicated at 112. Also, the inner longitudinal edges of the claws 101 are rounded as indicated at 113 (Fig. 10). In applying the tape 32 to a driving unit 33 or 34, the tape is inserted between the upper ends of the arms of yoke 104. The operator then simply draws downwardly the portion of tape then gripped in his fingers, causing the intervening portion of tape to exert downward pressure against the rounded corners 112. The arched condition of the tape where it engages corners 112 will stiffen it transversely, and accordingly, the downward pressure will be converted into lateral pressure against corners 112, causing the claws 101 to be wedged apart until the tape is permitted to pass between the claws, into engagement with a respective sprocket 90, or 90′. The entire operation is performed practically instantaneously, it being possible for the operator, in one quick movement, to grasp the tape, and to force it downwardly between claws 101 in one continuous motion, the jaws snapping apart and back together again so as to secure the arched portion of the tape between the periphery of a sprocket and the correspondingly arched bearing faces 102 of the claws 101. In removing the tape, a reverse procedure is followed. The operator grasps the incoming or outgoing portion of the tape, and simply pulls upwardly, causing the respective edges of such portions to arch upwardly at the extremities of claws 101 and to exert upward pressure against the rounded corners 112. Such upward pressure is translated into spreading pressure which forces the claws 101 apart and allows the tape to become freed therefrom.

This hold-down arrangement is an important characteristic of the system, since it saves considerable time which, in existing editing machines and machines of any kind wherein a tape or film is fed between sprockets, requires considerable time and some difficulty in threading the tape or film across the sprockets and beneath suitable holding devices. Also, it protects the film against breaking or tearing when being inserted into or removed from the drive units.

*Method of locating spots*

In the use of the above described apparatus for spot location on a sound film, in accordance with the improved method of my system, the sound tape to be examined is threaded over the respective driving units 33 and 34, and the limit control sliders 66, 67 are moved to their extreme positions at the respective ends of the apparatus. Drive shaft 92 is then turned in the normal forward direction, causing the tape to travel in the direction for properly reproducing the sound recorded thereon. (In the arrangement shown, this direction of tape movement is as indicated by arrow 125 in Fig. 1). As the taut stretch of tape between sprockets 90, 90′ passes over pick up head 41, disposed in a position intermediate sliders 66, 67 (so that the reproducing circuit through switch 45 is energized) the sound will be reproduced and delivered from the speaker which is embodied in a conventional electronic reproducing apparatus connected to binding posts 50, 50′ through conductors 114. Where the apparatus is attached to a conventional editing machine, this reproducing circuit will of course be the reproducing equipment of the editing machine.

The operator, having energized the motor that drives shaft 92, listens to the sound coming from the reproducer, until he hears the sound that requires editing. He then immediately stops drive to shaft 92. Through practice, the operator will be able to manually move the editing machine backwardly a short distance, so as to compensate for any coasting of the point of tape 32 to be edited, past the center of the apparatus. Ordinarily, the operator will attempt to bring this point approximately midway between the ends of the apparatus.

In the next step, motor 60 is energized by closing a manual control switch 113 therefor, driving belt 51 from which movement is transmitted to carriage 36 by roller 53, causing pick up head 41 to be reciprocated back and forth beneath the stretch of tape 32 between sprockets 90, 90′. The relative movement between pick up head and tape 32, thus induced, is substantially of the same rate as the relative movement when tape 32 is being driven by drive units 33, 34. As pick up head 41 moves toward pulley 56 in the proper direction relative to tape 32 (indicated by arrow 78 of Fig. 6) to properly reproduce the sound, it will, at the beginning of such movement, be de-energized until it reaches limit control slider 67. Engagement of starting button 46 with swinging trigger member 74 will close switch 45, rendering the pick up head 41 operative to reproduce sound until carriage 35 reaches slider 66. As it passes slider 66, cutoff button 47 will be pressed inwardly by roller 71, opening switch 45 and de-energizing the pickup circuit 114. It will now be apparent that sound will be reproduced only during the time that carriage 35 travels between sliders 67 and 66, in the proper direction 78 for normal reproduction. During the remainder of the movement in this direction and throughout the entire return movement of carriage 35, the pickup circuit will be dead, so that no sound will be reproduced. Thus the operator is able to hear only the normal sound produced by relative movement between pick up head and tape 32 in the proper direction, and to hear only that portion of it which is recorded upon the stretch of tape lying directly between sliders 66, 67.

In the next step, the operator commences to eliminate either the beginning portion or the end portion of the sound that is being reproduced, accomplishing this by sliding either slider 67 (to cut off the beginning portion) or slider 66 (to cut off the end portion) toward the other slider, meanwhile continuing the reciprocation of carriage 35. This movement of the slider may be accomplished quite rapidly, the operator hearing the recurrent rendition of the sound with succeeding portions thereof eliminated upon each recurrence, until finally the beginning or the end of the sound coincides with the cut off point or the "cut-in" point in the operation of the apparatus, where the operator may decide the track should be marked for an editing operation such as cutting of the tape at that point.

The drive mechanism may be energized to drive the tape either forwardly or backwardly whichever is required, in order to shift the tape in the proper direction. The backward driving mechanism will be utilized frequently for backing up the tape after a particular sound has been listened to. In many instances, the operator may find it best to listen to an entire sound record without stopping it, making a mental note of sounds that should be deleted or shortened. The reversing drive may then be employed to run the tape back to its starting point, and the operator may then proceed to drive the tape forwardly until he reaches one of the sounds that is to be revised or eliminated, then stopping the tape drive mechanism and starting the reciprocation of the sound head.

From the above description it will be apparent that a sound may be revised by shortening it, removing a beginning portion or an end portion or any selected intermediate portion thereof.

*Synchronization of sound track to a picture*

My apparatus, when used with a conventional editing machine having a picture viewer can be used for synchronizing a sound track to a picture. In such operation, the magnetic gap 44 of pick up head 41 is placed directly opposite the zero mark 86 of the scale, as indicated in Fig. 1. The picture film start mark is then placed at the starting point on the picture viewer. With the picture viewer and the editing attachment interlocked and driven in unison, the operator proceeds to listen to the sound and simultaneously to view the picture. If he finds that the sound track is out of synchronization with the picture, he moves the pick up carriage 35 in one direction or the other, as required, by rotating disc 58 by hand, through opening 124 in side plate 27 until synchronization is established. It will be apparent that by shifting pick up head 41 in the direction of movement of tape 32, the sound reproduction would be advanced with reference to the picture reproduction.

When synchronization has been obtained, the operator reads on the scale the displacement of pick up head 41 from the center mark 86, as indicated by the numbered marks 85 on cover 29. The mark number "1" indicates a displacement of one frame, the mark numbered "2," two frames, etc. A proper notation of the extent and direction of displacement of the sound track relative to the picture record is then made in the operator's notes, or directly upon the tape or film, and these notes are thereafter followed in shifting the sound track with reference to the picture record in the assembled film, so as to make the indicated corrections.

It will be apparent that other mechanisms may be employed for effectuating my improved editing system. Also, some changes in the construction and arrangement of parts of the mechanism may be made without departing from the spirit of the invention embodied in the mechanism.

I claim:

1. In a machine for editing a sound record having a sound track, a pickup adapted when relative scanning movement between said pickup and sound track occurs, to receive impulses from said track, an electric circuit for utilizing said impulses to actuate a sound reproducer, means for effecting said relative scanning movement in alternately opposite directions, and means for rendering said electric circuit operative to utilize said impulses only during an energized scanning path restricted to relative scanning movement in one direction only.

2. In a machine for editing a sound record having a sound track, a pickup adapted when relative scanning movement between said pickup and sound track occurs, to receive impulses from said track, an electric circuit for utilizing said impulses to actuate a sound reproducer, means for effecting said relative scanning movement in alternately opposite directions, and means for selectively restricting said energized scanning path to varying portions of the total scanning movement in said one direction.

3. In a machine for editing a sound record having a sound track, a pickup adapted when relative scanning movement between said pickup and sound track occurs, to receive impulses from said track, an electric circuit for utilizing said impulses to actuate a sound reproducer, means for effecting said relative scanning movement in alternately opposite directions, and means for selectively varying the position of either the beginning or the end of said energized scanning path with reference to the total scanning movement in said one direction.

4. In a machine for editing a sound record having a sound track, a pickup adapted when relative scanning movement between said pickup and sound track occurs, to receive impulses from said track, an electric circuit for utilizing said impulses to actuate a sound reproducer, means for effecting continuous unidirectional movement of the record so as to effect relative unidirectional scanning movement, means for effecting said relative scanning movement in alternately opposite directions, and means for rendering said electric circuit operative to utilize said impulses only during an energized scanning path restricted to relative scanning movement in one direction only.

5. In a machine for editing a sound record having a sound track, a pickup adapted when relative scanning movement between said pickup and sound track occurs, to receive impulses from said track, an electric circuit for utilizing said impulses to actuate a sound reproducer, means for moving said pickup alternately in opposite directions along said sound track while said record is maintained in a stationary position, to effect alternating scanning movements, and means for rendering said circuit responsive to said impulses only during movement of the pickup in one direction of said alternating scanning movements.

6. In a machine for editing a sound record having a sound track, a pickup adapted when relative scanning movement between said pickup and sound track occurs, to receive impulses from said track, an electric circuit for utilizing said impulses to actuate a sound reproducer, means for moving said pickup alternately in opposite directions along said sound track while said record is maintained in a stationary position, to effect alternating scanning movements, a control switch in said circuit, for rendering said circuit responsive and non-responsive to said impulses respectively when closed and opened, and means for successively actuating said switch at selectively varied points in the path of movement of said pickup whereby to effect intermittent energization of said circuit for intermittent sound reproduction, with corresponding variation of either the beginning or end point of the reproduced sound, with reference to the total scanning path of the pickup.

7. In a machine for editing a linear sound record, a pickup, a pair of spaced record driving units including means for driving the record past the pickup for unidirectional scanning of the record by the pickup, means on which the pickup is mounted for reciprocating movement along an arrested portion of the record lying between said driving units, for scanning of the record alternately in opposite directions, an electric circuit for utilizing impulses received by the pickup from the record during scanning movements, to actuate a sound reproducer, an electric switch in said circuit, said switch being associated and moving with said pickup, a pair of switch actuators for respectively opening and closing said switch in response to movement of the switch past the actuators, whereby to render said circuit respectively operative and inoperative to transmit said impulses, and separate manually adjustable means on which the respective actuators are mounted for adjustment to varying positions along the path of reciprocating movement of the switch, whereby to selectively vary the effective portion of the scanning path of said pickup relative to the sound record.

8. An editing machine as defined in claim 7, including manually controllable means for driving said pickup and switch, independently of the drive to said driving units, the latter drive being a manually controllable, reversible drive for selectively driving said record in either of opposite directions.

9. An editing machine as defined in claim 8, including a carriage on which said pickup and switch are both mounted, said carriage having spaced ways disposed transversely with respect to the path of reciprocating movement thereof, an endless flexible drive element having closely spaced stretches thereof travelling linearly and parallel to said path of reciprocating movement, and a drive transmitting element carried by said flexible drive element, engaged between said ways for transverse movements relative to said carriage, and for transmitting to said carriage said reciprocating movement.

CARLOS E. RIVAS.

References Cited in the file of this patent

UNITED STATES PATENTS

| Number | Name | Date |
|---|---|---|
| 2,499,699 | Linkham | Mar. 7, 1950 |
| 2,528,184 | Schwayder | Oct. 31, 1950 |
| 2,540,406 | Ranger | Feb. 6, 1951 |